Patented Dec. 4, 1951

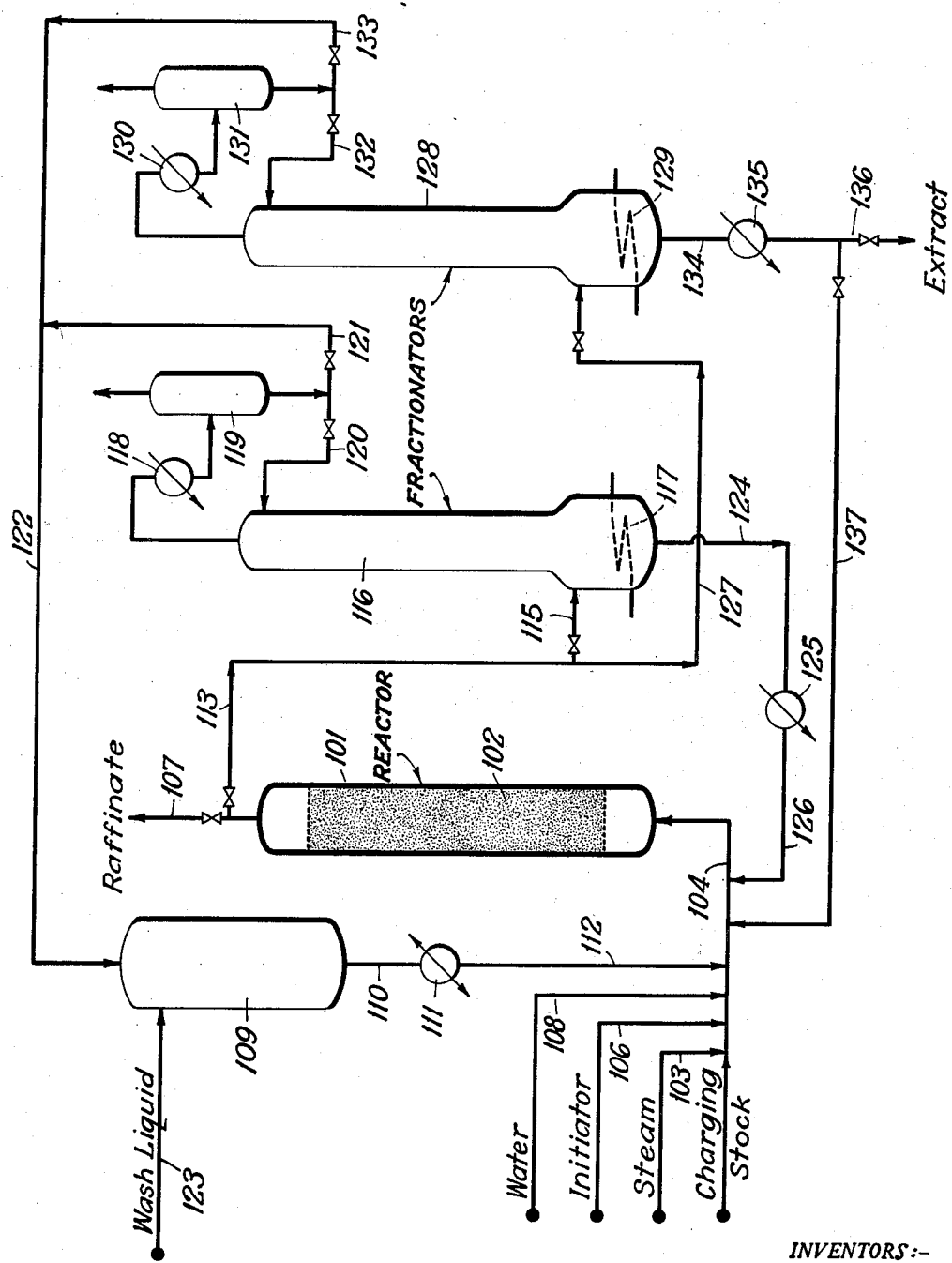

2,577,202

UNITED STATES PATENT OFFICE 2,577,202

PROCESS FOR SEPARATING ORGANIC COMPOUNDS

Arthur P. Lien, Wilford J. Zimmerschied, and Willard S. Higley, Hammond, Ind., assignors to Standard Oil Company, Chicago, Ill., a corporation of Indiana Application September 30, 1949, Serial No. 118,982

10 Claims. (Cl. 260—676)

1

Our invention relates to the separation of organic compounds. More particularly, it relates to an improved process for the recovery of organic compounds having the property of forming solid adducts with urea from mixtures thereof with other organic compounds.

One object of our invention is to effect a substantially complete separation of urea-adduct-forming organic compounds, including certain straight-chain and monomethyl-branched organic compounds, from a mixture thereof with other organic compounds. Another object of our invention is to effect said separation under optimum conditions of urea adductivity, thereby permitting substantial economies in processing time and materials. Other objects of our invention and its advantages over the prior art will be apparent from the following description and examples.

It has been known for some time that urea forms crystalline adducts with various straight-chain organic compounds, but generally not with branched-chain or cyclic compounds; and the isolation of such straight-chain organic compounds has been successfully effected by means of this selective reactivity. The prior art indicates that the desired adduct formation is successfully effectuated only in the presence of a urea solvent, such as water, lower alcohols, or the like.

During the course of our work on the formation of urea adducts, we have discovered that various substances retard or altogether repress the desired reaction, as disclosed in our copending joint application, Serial No. 118,983, filed September 30, 1949. Among such inhibitors are heteropolycyclic sulfur compounds, such as those contained in small concentration in West Texas virgin gas oil, Midcontinent gas oil, and light catalytic cycle stock, from which they may be removed by treatment with an adsorbent solid such as silica gel. In the reaction of urea with charging stocks containing such inhibitors, water alone is ineffective as a promoter, and the activating effect of alcohols and other urea solvents is substantially diminished with respect to both effectiveness and duration.

We have now discovered that inhibited charging stocks will readily form adducts with urea if the urea is first contacted in the presence of water with an inhibitor-free organic compound capable of forming a urea adduct, and the charging stock is thereafter contacted with the pretreated urea in the presence of an optimum proportion of water, suitably between about 0.02 and 4 percent by weight, based on urea.

One embodiment of our invention is illustrated

2 in the accompanying flowsheet, from which various pumps, valves, and other mechanical devices have been omitted for simplicity, since they are believed to be unnecessary for a clear understanding of our invention.

Reactor 101, suitably of the fixed-bed tower type, is charged with granular urea, 102. One or more duplicate reactors (not illustrated) are provided and are manifolded and used successively in order to permit substantially continuous operation. The urea granules within the reactor are preferably commingled with granules of a spacing material such as cork, charcoal, carbon, porcelain, or the like, to reduce the tendency of the urea bed to become compacted and less pervious during use. Before being employed in the process, the urea is pretreated, either outside or within the reactor, for example by introduction of steam through lines 103 and 104, to provide a moisture content of at least about 0.02 percent by weight of the urea. A water content up to around 4.0 percent by weight or somewhat higher is permissible so long as the crystalline structure of the urea is not substantially altered. A preferred range is 0.07 to 1.0 percent by weight. The desired proportion of water may subsequently be maintained by introduction of a suitable quantity of water with the charging stock, as will be hereafter described.

After the urea has been humidified, an adduct initiator is added through lines 106 and 104. The initiator may consist of any organic compound capable of forming a stable solid adduct with urea. Such compounds include straight-chain hydrocarbons having six or more carbon atoms in the molecule and preferably at least four methylene groups, and straight-chain or monomethyl-branched organic esters having four or more methylene groups in the straight-chain portion of the molecule. For example, a hydrocarbon such as cetane may be used to initiate adduct formation, and any subsequent treatment may be effected with the cetane extract recovered from the urea or a purified portion of said extract. A sufficient quantity of initiator is introduced into the bottom of reactor 101, and sufficient time is allowed to insure that adduct formation has begun in the bottom portion of the reaction zone. A convenient criterion for determining when a suitable degree of suitable adduct formation has taken place is a temperature rise of 1 to 10° C., preferably 2 to 6° C., in the bottom portion of the reactor. Thereafter, the flow of initiator is cut off, and the charging stock is introduced into the reaction zone. Introduction of the charging stock is preferably started while the reaction of urea with the initiator is still in progress, suitably within about one hour after the introduction of the initiator, and preferably before the heat of initiation has been dissipated.

The charging stock is introduced through line 104 into reactor 101 and allowed to flow upward therein. Temperatures between about 0 and 50° C., preferably 15 to 35° C., are maintained within the reaction zone. The raffinate, substantially or completely depleted of urea-reactive constituents, flows from the top of reactor 101 through valved line 107.

During the passage of the charging stock through the reactor, there is a tendency for the moisture content of the urea to be reduced below the optimum range. Intermittent or continuous introduction of traces of moisture is therefore desirable. This is conveniently accomplished by partially or completely saturating the charging stock with moisture by prior contact with water, or by introducing controlled amounts of water into the feed stream through line 108.

When the urea in the reactor approaches saturation with reactive organic compounds and begins to lose its effectiveness for removing the desired constituents of the charging stock, the flow of charging stock is diverted from reactor 101 to another reactor (not shown), filled with freshly initiated urea of the desired moisture content. A wash liquid, such as isooctane, benzene, or other low-boiling hydrocarbon inert to urea, is then led from storage tank 109 through line 110, heat exchanger 111, line 112, and line 104 into the bottom of reactor 101, where it passes upward to remove occluded, unreacted material from the urea adduct. To avoid decomposition of the adduct, this washing step is conducted at low temperatures around −10 to 30° C., preferably 10 to 20° C. The wash effluent is led through valved lines 113 and 115 to the bottom of stripper 116, equipped with steam scroll 117, from which the wash liquid is distilled overhead through condenser 118 into reflux drum 119. From the reflux drum a portion is refluxed to the top of the stripper through valved line 120, while the remainder is withdrawn through valved line 121 and returned through line 122 to storage tank 109. Makeup wash liquid is supplied through line 123 to storage tank 109. The bottoms from stripper 116 emerge through line 124 and are recycled through cooler 125, line 126, and line 104 to the bottom of reactor 101 in admixture with fresh charging stock.

The washed adduct in reactor 101 may be discharged therefrom and decomposed by methods employed in the prior art to liberate the organic compound contained therein. For example, the adduct may be contacted with water, methanol, or other urea solvent, or it may be heated above its melting point, or the organic component may be stripped out under vacuum. Alernatively and preferably, however, the decomposition is effected in situ by passing over the adduct an additional quantity of the wash liquid from storage tank 109 at an elevated temperature above about 30° C. and below the melting point of the adduct, ordinarily between about 60 and 130° C., and preferably between about 100 and 120° C., as disclosed in the copending joint application of Wilford J. Zimmerschied and Arthur P. Lien, Serial No. 118,981, filed September 30, 1949. The reactor is preferably equipped with an outer jacket, through which steam is passed at atmospheric or superatmospheric pressure to maintain the desired temperature within the reactor. The wash liquid flows from storage tank 109 through line 110, heat exchanger 111 and lines 112 and 104 into the bottom of reactor 101. The effluent wash liquid, containing organic compounds removed from the urea adduct, flows out of the top of reactor 101 through valved lines 113 and 127 into stripper 128, equipped with steam scroll 129. Therein, the wash liquid is fractionally distilled and emerges overhead through condenser 130 into reflux drum 131, from which a portion is refluxed through valved line 132 to the top of the stripper, while the remainder is withdrawn through valved line 133 and returned through line 122 to storage tank 109. The desired organic compounds from the urea adduct are withdrawn as a bottom stream from stripper 128 through line 134, cooler 135, and valved line 136, and may thereafter be further purified if desired, by fractional distillation or by an additional treatment with urea. A portion of this material may be withdrawn through valved line 137 and supplied through line 104 to reactor 101 for initiation of adduct formation. Since, however, small traces of certain impurities in either the charging stock or initiator stream have the power to inhibit the initiation of the reaction, the bottoms stream from stripper 128 is preferably purified before being used as an initiator. The purification may conveniently be carried out by treatment with silica gel, clay, charcoal, or other surface-active solids or by extraction with a concentrated aqueous solution of a strong inorganic acid such as sulfuric acid, hydrofluoric acid, and the like.

During the decomposition of the urea adduct, involving a hot liquid wash at elevated temperature, the moisture content of the urea is largely depleted. To prepare the urea for further reaction, it may be removed from the reactor and humidified in a steam cabinet; but it is preferably humidified in situ. This is accomplished by passing steam by way of lines 103 and 104 through the heated urea bed until the desired moisture content, as previously defined, is attained.

It will be apparent that our invention may be practiced in numerous other ways described in the prior art relating to urea separations. Our charging stock may, for example, be simply agitated with pretreated urea, and the resulting slurry may be filtered to remove the raffinate therefrom. Or we may use a moving bed of pretreated urea, as in the so-called Thermofor technique. The resulting adducts may be washed and decomposed as described above.

The formation of urea adducts takes place rapidly, so that 0.1 hour of contact time between the urea and the charging stock is ordinarily sufficient when employing the slurry technique for adduct formation. Longer times may of course be used without adverse effect on the reaction, and may be desirable for example in tower-type reactors, where from 0.5 to 1 hour may be needed for substantially complete reaction.

Ordinarily, a minimum molar ratio of urea to adduct-forming constituents in the charging stock of around $3n/4$ is required for substantially complete reaction, where $n$ is the average number of carbon atoms in the urea adduct-forming constituents. Higher ratios of urea may be used as a precautionary measure if desired, but are not in general necessary.

If the charging stock is solid or viscous at the desired reaction temperature, or comprises predominantly urea-reactive compounds, then before being contacted with urea it should first be diluted with an organic liquid having substantially no reactivity with or solvency for urea.

Suitable diluents including aliphatic hydrocarbons, especially those having less than six carbon atoms in the molecule, such as butane and pentane; branched-chain hydrocarbons, such as isooctane, neohexane, and the like; cyclic hydrocarbons, such as benzene, toluene, xylene, cyclohexane, methylcyclohexane, and the like; ethers, such as ethyl ether, butyl ether, and the like; and many others. Any of these diluents are also suitable for use in washing the adduct free from unreacted charging stock and for subsequently washing the adducted organic compound therefrom at an elevated temperature.

Our invention will be more fully understood from the following specific examples.

Example I

Five portions of West Texas virgin gas oil having the following properties

Index of refraction $n_D^{20}$_____ 1.4820
API gravity_____ 31.5
ASTM distillation, °C_____ 223-340
Sulfur content, wt.-percent_____ 1.58
Straight-chain compounds, vol.-percent__ 13.9 were contacted in separate tests with urea containing 0.097, 5.1, 13.8, 34.8, and 48.3 percent by weight of water, based on urea, the last being a saturated aqueous solution of urea. No adduct formation at all occurred in any of the tests. From these results, it is apparent that water alone is incapable of overcoming the natural inhibitors present in West Texas virgin gas oil.

Example II

A quantity of urea was dried in an oven at 106° C for 15 hours, and was thereafter found to contain 0.00% water when analyzed by the Karl Fischer method. To a 9-gram portion of the dried urea were then added 4 ml. of silica gel-treated West Texas virgin gas oil urea extract, this material being substantially pure straight-chain paraffins, free from water and inhibitors for adduct formation. No reaction took place, and no adduct was formed. Thus, it appears that urea does not react to form adducts in the absence of water or an activator.

Example III

In each of the following tests, 6.5 gram-moles of urea were humidified by contact with steam in an enclosed cabinet; and after being transferred into a reactor tower, each was treated with 24 milliliters of cetane as initiator for adduct formation. Thereafter, a measured volume of West Texas virgin gas oil was fed through the tower, and the resulting adduct was decomposed to liberate the adducted hydrocarbons. The results were as follows:

| Water Content of Urea | Feed Volume | Yield, Based on Straight-Chain Compounds in Feed |
|---|---|---|
| Wt. per cent | Ml. | Vol. per cent |
| 0.035 | 1,500 | 7.0 |
| 0.070 | 1,340 | 51.6 |
| 0.097 | 1,500 | 52.8 |

While our invention has been illustrated in connection with a specific charging stock and a specific operating procedure, it will be apparent that we are not limited thereto, but may apply our invention broadly within the general terms disclosed herein. Our invention is suitable for separating straight-chain organic compounds, such as hydrocarbons, alcohols, aldehydes, ketones, carboxylic acids, mercaptans, disulfides, esters, and the like, having six or more carbon atoms in the molecule, from branched-chain and/or cyclic compounds, as taught in the prior art; and our invention is further suitable for separating monomethyl-branched organic esters having four or more methylene groups in the straight-chain portion of the molecule from other branched and/or cyclic compounds. It is to be understood that any modifications or equivalents that would ordinarily occur to those skilled in the art are to be considered as lying within the scope of our invention.

In accordance with the foregoing description, we claim as our invention:

1. In a process for urea-treating a mixture of a urea-adduct-forming aliphatic organic compound and an inhibitor for urea-adduct formation and obtaining a urea adduct of said aliphatic organic compound, the steps which comprise pretreating urea by contacting said urea with water and an initiator for urea-adduct formation in the absence of an inhibitor for urea-adduct formation, said initiator consisting essentially of an aliphatic organic compound having the property of forming a solid adduct with urea, contacting said mixture under urea-adduct-forming conditions with said pretreated urea, and withdrawing a solid adduct of urea and said aliphatic organic compound initially present in said mixture.

2. The process of claim 1 wherein said initiator is a compound selected from the group consisting of straight-chain organic compounds containing at least four methylene groups and monomethyl-branched organic esters wherein the straight-chain portion of the molecule contains at least four methylene groups.

3. The process of claim 1 wherein said initiator is a hydrocarbon.

4. The process of claim 1 wherein said urea is contacted during said pretreatment with between about 0.05 and 4 percent by weight of water.

5. The process of claim 1 wherein said pretreated urea is contacted with said mixture at a temperature between about 0 and 50° C.

6. The process of claim 1 wherein said pretreated urea is contacted with said mixture for a period in excess of around 0.1 hour.

7. The process of claim 1 wherein said pretreated urea is contacted with said mixture in the presence of an organic liquid having substantially no reactivity with or solvency for urea.

8. In a process for separating a urea-adduct-forming aliphatic organic compound from a mixture thereof with an inhibitor for urea-adduct formation and another organic compound incapable of urea-adduct formation, the steps which comprise pretreating urea by contacting said urea with between about 0.02 and 4 percent by weight of water based on urea and with an initiator for urea-adduct formation, in the absence of an inhibitor for urea-adduct formation, said initiator consisting essentially of an aliphatic organic compound having the property of forming a solid adduct with urea, contacting said mixture with said pretreated urea under urea-adduct-forming conditions in the presence of between about 0.02 and 4 percent by weight of water based on said urea, separating the resulting solid adduct from the resulting raffinate, and decomposing said adduct and recovering therefrom said urea-adduct-forming aliphatic organic compound initially present in said mixture.

9. In a process for separating a urea-adduct-forming aliphatic organic compound from a mixture thereof with an inhibitor for urea-adduct formation and another organic compound incapable of urea-adduct formation, the steps which comprise pretreating urea by contacting said urea with water and an initiator for urea-adduct formation in the absence of an inhibitor for urea-adduct formation, said initiator consisting essentially of an aliphatic organic compound having the property of forming a solid adduct with urea, contacting said mixture with said pretreated urea under urea-adduct-forming conditions in the presence of between about 0.07 and 1 percent by weight of water based on said urea, separating the resulting solid adduct from the resulting raffinate, and contacting said adduct with an organic liquid at a temperature between about 60 and 130° C., said organic liquid being a solvent for said urea-adduct-forming aliphatic organic compound and a non-solvent for urea, whereby said urea-adduct-forming organic compound is removed from said adduct, and whereby said urea is restored to condition for further adduct formation.

10. A process for recovering a straight-chain hydrocarbon containing at least six carbon atoms from a mixture thereof with an inhibitor for urea-adduct formation and another organic compound, said other organic compound being a non-solvent for urea and unreactive therewith, which comprises pretreating urea containing from about 0.07 to 1 percent by weight of water based on urea in the absence of an inhibitor for urea-adduct formation with a straight-chain hydrocarbon containing at least six carbon atoms in the molecule, contacting the resulting pretreated urea with said mixture at a temperature between about 15 and 35° C. for at least about 0.1 hour in the presence of about 0.07 to 1 percent by weight of water based on urea, whereby a solid adduct containing urea and said straight-chain hydrocarbon from said mixture is formed, washing said adduct with a non-solvent for urea at a temperature below about 30° C., whereby unreacted components of said mixture are removed, and contacting said adduct with a urea-unreactive hydrocarbon at a temperature between about 100 and 120° C., whereby said straight-chain hydrocarbon from said mixture is removed from said adduct, and whereby said urea is restored to condition for further adduct formation.

ARTHUR P. LIEN.
WILFORD J. ZIMMERSCHIED.
WILLARD S. HIGLEY.

REFERENCES CITED

The following references are of record in the file of this patent:

UNITED STATES PATENTS

| Number | Name | Date |
|---|---|---|
| 2,499,820 | Fetterly | Mar. 7, 1950 |

FOREIGN PATENTS

| Number | Country | Date |
|---|---|---|
| 17,339 | Australia | Dec. 31, 1947 |

OTHER REFERENCES

Bengen, T. O. M. Reel 143, May 22, 1946, Urea.
Zimmerschied et al. Meeting A. C. S., Sept. 18–23, 1949.
Zimmerschied et al. J. A. C. S., 71, 2947 (Aug. 1949).